United States Patent
Mack

(10) Patent No.: US 7,269,922 B1
(45) Date of Patent: Sep. 18, 2007

(54) MOTORIZED FISHING POLE

(76) Inventor: James Mack, 4307 Ash Creek CV, Memphis, TN (US) 38141

( * ) Notice: Subject to any disclaimer, the term of this patent is extended or adjusted under 35 U.S.C. 154(b) by 0 days.

(21) Appl. No.: 11/258,967

(22) Filed: Oct. 26, 2005

Related U.S. Application Data

(60) Provisional application No. 60/622,000, filed on Oct. 26, 2004.

(51) Int. Cl.
*A01K 89/012* (2006.01)
*A01K 89/017* (2006.01)

(52) U.S. Cl. .................. 43/21; 43/26.1; 242/225; 242/227

(58) Field of Classification Search ............ 43/18.1 R, 43/19, 19.2, 20, 21, 26.1; 242/225, 227, 242/228, 250
See application file for complete search history.

(56) References Cited

U.S. PATENT DOCUMENTS

| | | | |
|---|---|---|---|
| 2,190,398 A | | 2/1940 | Bugatti |
| 2,714,271 A | | 8/1955 | Stratton |
| 2,760,736 A | | 8/1956 | Mihalko et al. |
| 2,866,291 A | * | 12/1958 | Duell .......................... 242/225 |
| 3,017,134 A | * | 1/1962 | Duvall ....................... 242/250 |
| 3,030,046 A | * | 4/1962 | Markoff-Moghadam .... 242/250 |
| 4,021,003 A | * | 5/1977 | Watkins ....................... 242/250 |
| 4,075,629 A | * | 2/1978 | Miyamae ..................... 340/668 |
| 4,378,652 A | * | 4/1983 | Lindgren ..................... 43/26.1 |
| 4,515,324 A | * | 5/1985 | Barton ........................ 242/250 |
| 4,598,878 A | * | 7/1986 | Steffan ........................ 242/250 |
| 4,634,072 A | * | 1/1987 | Stealy ......................... 242/225 |
| 4,771,964 A | * | 9/1988 | Watanabe et al. ........... 242/250 |
| 4,775,112 A | * | 10/1988 | Urso ........................... 242/234 |
| 4,784,346 A | * | 11/1988 | Steffan ........................ 242/250 |
| 4,832,277 A | * | 5/1989 | Ohtake ........................ 242/250 |
| 5,042,188 A | * | 8/1991 | Ho ................................ 43/21 |
| 5,878,523 A | * | 3/1999 | Wenzel .......................... 43/21 |
| 6,012,665 A | * | 1/2000 | Olona ........................... 242/250 |
| 6,056,219 A | * | 5/2000 | Barkley ....................... 242/225 |
| 6,220,538 B1 | * | 4/2001 | Durso .......................... 242/250 |
| 6,880,775 B1 | * | 4/2005 | Wenzel ....................... 242/225 |

\* cited by examiner

*Primary Examiner*—David Parsley

(57) ABSTRACT

An attachment for use in combination with a fishing pole. The attachment is attached to the fishing pole and is used to provide an automatic winding apparatus to retract a length of fishing line back around the reel after it has been cast out.

3 Claims, 3 Drawing Sheets

MOTORIZED FISHING POLE

This application claims the benefit of U.S. Provisional Application No. 60/622,000, filed Oct. 26, 2004.

BACKGROUND OF THE INVENTION

1. Field of the Invention

The present invention concerns that of a new and improved attachment for use in combination with a fishing pole.

2. Description of the Prior Art

U.S. Pat. No. 2,190,398, issued to Bugatti, discloses a power driven fishing reel having a motor attached to the bottom of the rod, having a shaft for turning the spindle on the reel.

U.S. Pat. No. 2,760,736, issued to Mihalko, discloses an electric power driven fishing reel mounted on the rod that is actated using an operational switch.

U.S. Pat. No. 2,714,271, issued to Stratton, discloses a power driven fishing reel comprised of a motor mounted on a fixed suppor, joined to the reel with a flexible shaft.

SUMMARY

The present invention concerns that of a new and improved attachment for use in combination with a fishing pole. The attachment is attached to the fishing pole and is used to provide an automatic winding apparatus to retract a length of fishing line back around the reel after it has been cast out.

There has thus been outlined, rather broadly, the more important features of an automatic winding apparatus for a fishing pole that the detailed description thereof that follows may be better understood and in order that the present contribution to the art may be better appreciated. There are, of course, additional features of the automatic winding apparatus for a fishing pole that will be described hereinafter and which will form the subject matter of the claims appended hereto.

In this respect, before explaining at least one embodiment of the automatic winding apparatus for a fishing pole in detail, it is to be understood that the automatic winding apparatus for a fishing pole is not limited in its application to the details of construction and to the arrangements of the components set forth in the following description or illustrated in the drawings. The automatic winding apparatus for a fishing pole is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present automatic winding apparatus for a fishing pole. It is important, therefore, that the claims be regarded as including such equivalent constructions insofar as they do not depart from the spirit and scope of the present invention.

It is therefore an object of the present invention to provide an automatic winding apparatus for a fishing pole which has all of the advantages of the prior art and none of the disadvantages.

It is another object of the present invention to provide an automatic winding apparatus for a fishing pole which may be easily and efficiently manufactured and marketed.

It is another object of the present invention to provide an automatic winding apparatus for a fishing pole which is of durable and reliable construction.

It is yet another object of the present invention to provide an automatic winding apparatus for a fishing pole which is economically affordable and available for relevant market segment of the purchasing public.

Other objects, features and advantages of the present invention will become more readily apparent from the following detailed description of the preferred embodiment when considered with the attached drawings and appended claims.

DETAILED DESCRIPTION OF THE PREFERRED EMBODIMENTS

Figure 1:
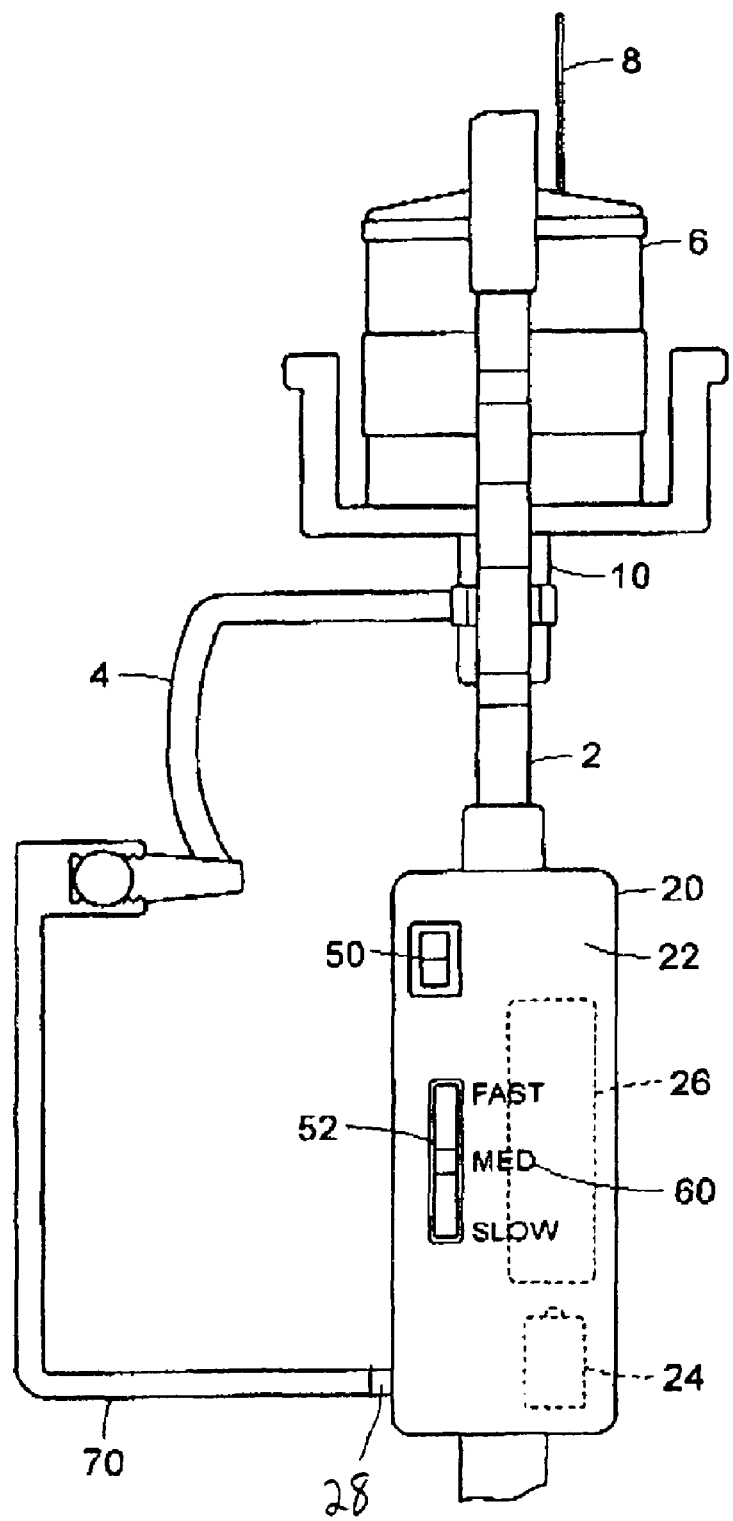
FIGS. 1 and 2 show top views of the fishing pole with the winder arm in retracted and forward positions, respectively.
Figure 2:
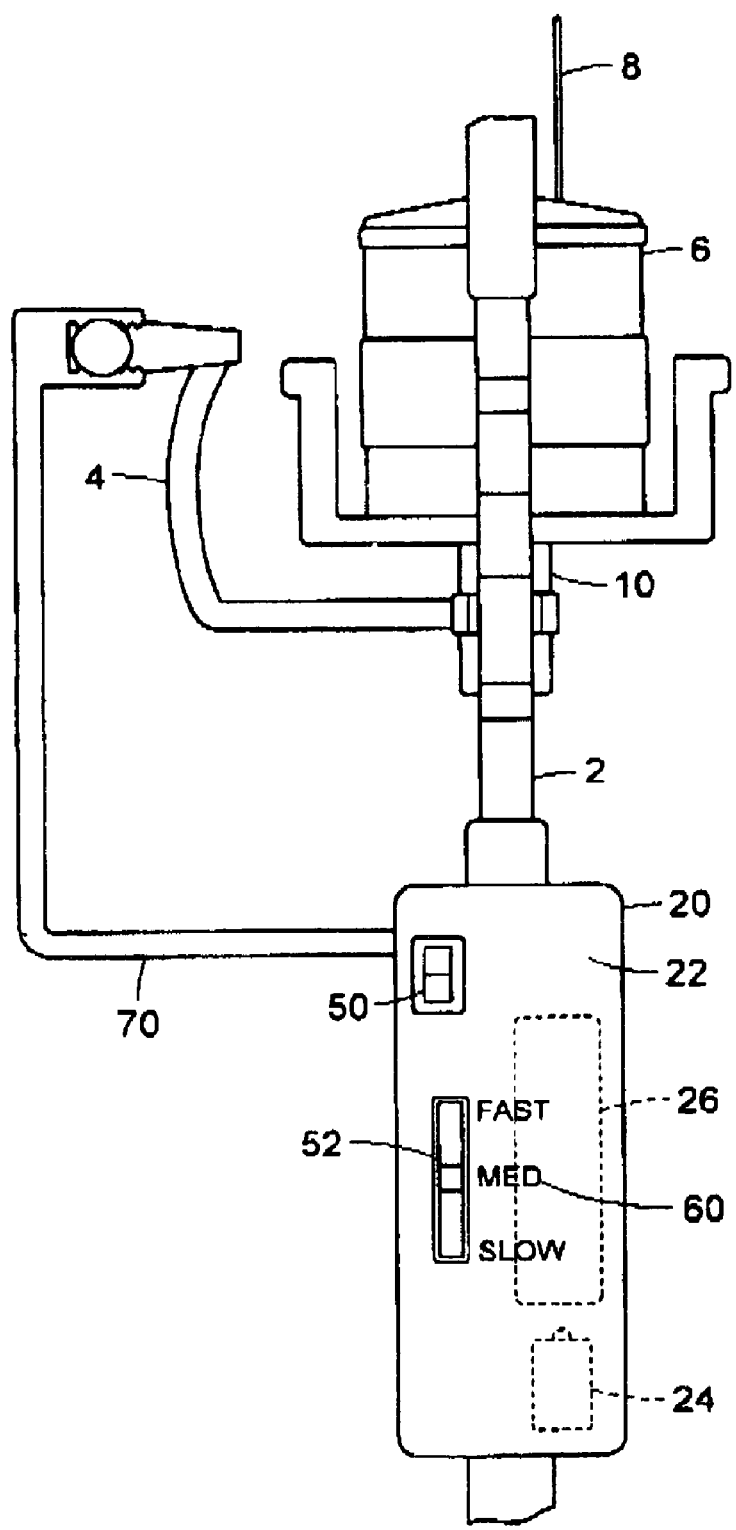

FIGS. 1 and 2 show top views of the fishing pole 2 with the winder arm 4 in retracted and forward positions, respectively.

Fishing pole 2 has two ends, a handle end and a free end. Near the handle end is attached a fishing reel 6, which has a length of incorporated fishing line 8. The fishing reel 6 is usually axially attached to an attachment 10, which is in turn attached to the fishing pole 2. Once a length of fishing line 8 has been cast out in an attempt to catch fish, an individual can rotate an attached winder arm 4 in a cylindrical manner to slowly retract the length of output fishing line 8 back onto the fishing reel 6.

Winder arm 4 has two ends, a handle end and an attached end. The attached end of the winder arm 4 is axially attached to the fishing reel 6, allowing an individual to slowly rotate the winder arm 4 around in a cylindrical manner to pull back a length of fishing line 8 that has been cast out. A user would do this by grasping the handle end of the winder arm 4, which can be a rather tedious task over time if an individual fishes for a long period of time.

Automatic handle apparatus 20 is attached to the fishing pole 2 near the handle end of the fishing pole 2. Apparatus 20 has at least four surfaces, including a top surface, a bottom surface, a left surface and a right surface. Apparatus 20 has an outer casing 22 which houses a battery 24 and a motor 26.

Figure 3:
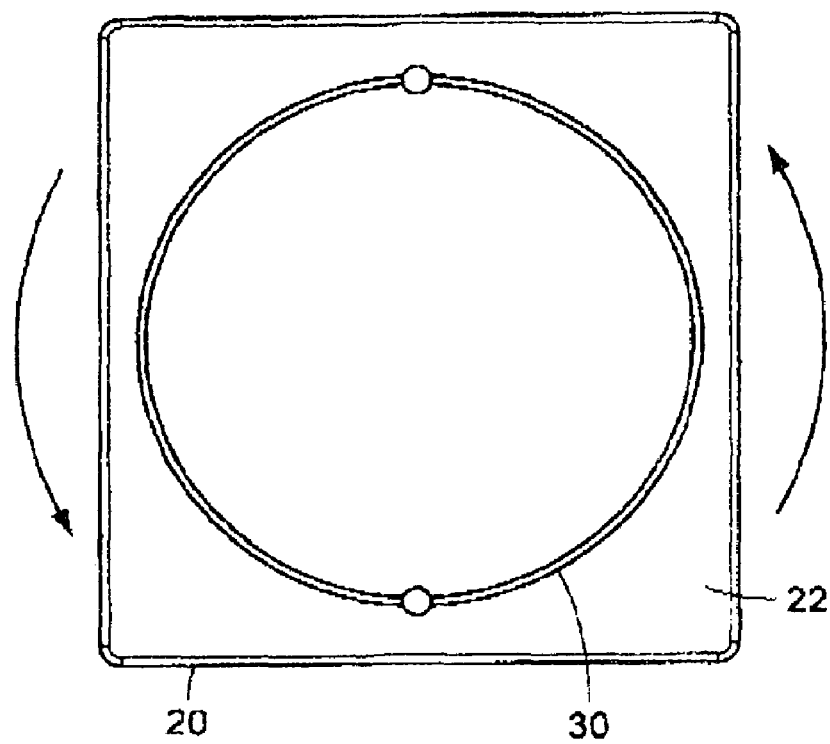
FIG. 3 show a side view of the automatic winder box.
Figure 4:
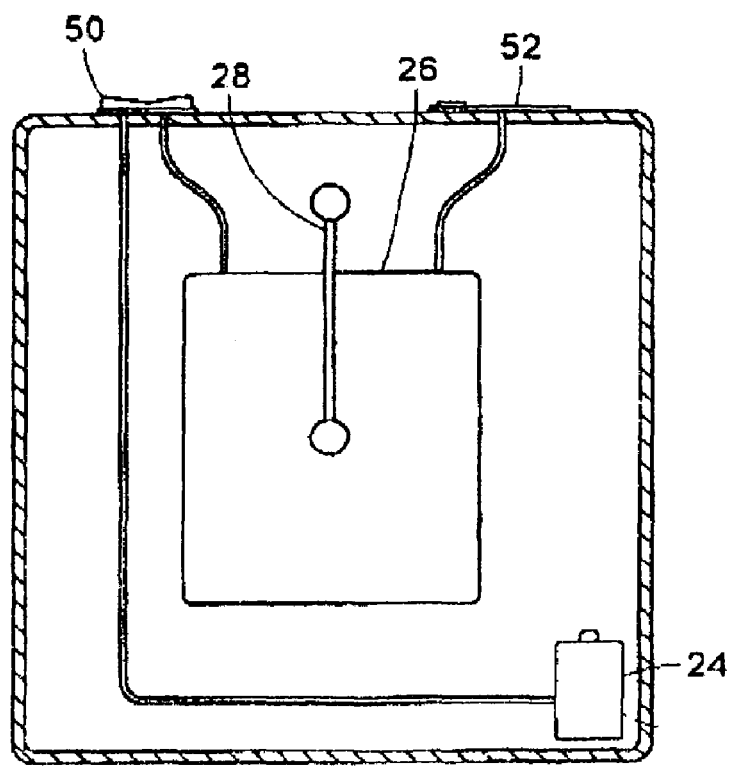
FIG. 4 shows a cross-sectional view of the inside of the automatic winder box.

While FIGS. 1 and 2 show the full extent of the rotation of the automatic handle apparatus 20, FIGS. 3 and 4 also need to be looked at to understand the full extent of the present invention. FIG. 3 show a side view of the automatic handle apparatus 20, while FIG. 4 shows a cross-sectional view of the inside of the automatic handle apparatus 20.

As previously indicated, outer casing 22 of automatic handle apparatus 20 houses a motor 26. Attached to motor 26 is an internal rotating arm 28 which has two ends, an attached end and an external end. The attached end of the internal rotating arm 28 rotates on an axial basis, while the external end of the internal rotating arm 28 rotates around a circular track 30 that is located on the left face of the automatic handle apparatus 20.

Attached to the internal rotating arm 28 is an extender arm 70 that has two ends, a first end and a second end. The first end of the extender arm 70 is fixedly attached to the external end of the internal rotating arm 28. The second end of the extender arm 70 is removably attached to the handle end of the winder arm 4.

The extender arm 70 is rigid and does not flex at all. Therefore, in order for this invention to properly function, the diameter of the circular track 30 is designed to be the same as the diameter of an imaginary circle created by the handle end of the winder arm 4 due to the fact of the winder arm 4 spinning around in a circle.

The battery 24 within the outer casing 22 is located within a battery compartment 40 and is accessible through a battery panel access door 42. The battery 24 provides power to the motor 26.

FIGS. 1 and 2 shows the top surface of the automatic handle apparatus 20, which includes an on/off switch 50 and a three-position speed switch 52. On/off switch 50 acts as a circuit in between the battery 24 and the motor 26. When the on/off switch 50 is in the "on" position, the electrical connections in between the battery 24 and the motor 26 are complete and the automatic handle apparatus 20 will operate. When the on/off switch 50 is in the "off" position, the electrical connections in between the battery 24 and the motor 26 are not complete and the automatic handle apparatus 20 will not operate.

The three-position switch 52 on the top surface of the automatic handle apparatus 20 has labeling 60 next to it to indicate positions. The switch 52 has three positions, including "fast," "medium," and "slow." Providing that the on/off switch 50 is in the on position, an individual can choose one of the three speeds on the switch 52 and use the automatic handle apparatus 20 accordingly.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A fishing apparatus comprising:
   a fishing pole having a handle end and a free end,
   a fishing reel,
   means for attaching the fishing reel to the fishing pole near the handle end of the fishing pole,
   fishing line attached to the fishing reel,
   a winder arm having a handle end and an attached end, the attached end of the winder arm being axially attached directly to the fishing reel, wherein an individual can rotate the winder arm to retrieve a length of fishing line that has been extended,
   an automatic handle apparatus attached to the fishing pole near the handle end of the fishing pole, the automatic handle apparatus having a top surface, a bottom surface, a left surface, and a right surface, the automatic handle apparatus having an outer casing,
   a motor located within the automatic handle apparatus,
   power means for providing power to the automatic handle apparatus,
   a circular track formed on a surface of the automatic handle apparatus through the outer casing creating a circular opening,
   an internal rotating arm attached directly to the motor, the internal rotating arm having an attached end and an external end, the attached end of the internal rotating arm rotating on an axial basis, the external end of the internal rotating arm rotating around and extending through the circular track,
   an external extender arm having a first end and a second end, the first end of the extender arm being fixedly attached to the external end of the internal rotating arm, the second end of the extender arm being removably attached directly to the handle end of the winder arm, the extender arm being rigid and not flexible, the extender arm being located completely outside the outer casing,
   an on/off switch located on the top surface of the automatic handle apparatus, the on/off switch acting as a circuit in between the motor and the power means, the on/off switch having two positions comprising an "on" position and an "off" position, wherein the on/off switch is an open circuit when the on/off switch is in the "on" position and allowing the electrical connections between the power means and the motor to be complete, allowing the automatic handle apparatus to operate, further wherein the on/off switch is a closed circuit when the on/off switch is in the "off" position and allowing the electrical connections between the power means and the motor to be unattached,
   a three-position switch located on the top surface of the automatic handle apparatus, the three-position switch having three positions comprising fast, medium, and slow, wherein choosing one of these three positions will alter speed of the automatic handle apparatus.

2. A fishing apparatus according to claim 1 wherein the means for attaching the fishing reel to the fishing pole near the handle end of the fishing pole further comprises:
   an attachment attached to the fishing pole near the handle end of the fishing pole,
   wherein the fishing reel is axially attached to the attachment.

3. A fishing apparatus according to claim 2 wherein the power means for providing power to the automatic handle apparatus further comprises:
   a battery compartment located within the outer casing,
   at least one battery located within the battery compartment,
   a battery panel access door covering the battery compartment and allowing access to the battery located within the battery compartment.

\* \* \* \* \*